US008665674B2

(12) United States Patent
Someya

(10) Patent No.: US 8,665,674 B2
(45) Date of Patent: Mar. 4, 2014

(54) TIME CODE DISCRIMINATION APPARATUS AND WAVE CLOCK

(75) Inventor: Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 994 days.

(21) Appl. No.: 12/494,639

(22) Filed: Jun. 30, 2009

(65) Prior Publication Data

US 2009/0323478 A1 Dec. 31, 2009

(30) Foreign Application Priority Data

Jun. 30, 2008 (JP) ................................ 2008-170317

(51) Int. Cl.
*H04L 27/06* (2006.01)

(52) U.S. Cl.
USPC ............................................ 368/47; 375/342

(58) Field of Classification Search
USPC ................ 368/47, 46; 713/500; 375/354, 342
See application file for complete search history.

(56) References Cited

U.S. PATENT DOCUMENTS 7,042,808 B2 * 5/2006 Saitoh ............................ 368/47
7,411,870 B2 8/2008 Murata et al.
7,428,190 B2 9/2008 Sano
7,492,846 B2 * 2/2009 Kondo .......................... 375/354
7,555,029 B2 * 6/2009 Kondo .......................... 375/130
8,180,008 B2 * 5/2012 Wang et al. .................... 375/359
8,223,593 B2 * 7/2012 Fujisawa ......................... 368/47
2006/0050824 A1 3/2006 Kondo
2009/0259707 A1 * 10/2009 Martin et al. ................ 708/422

FOREIGN PATENT DOCUMENTS

JP 2006-071318 A 3/2006
JP 2007-139705 A 6/2007

OTHER PUBLICATIONS

Japanese Office Action dated May 25, 2010 and English translation thereof in counterpart Japanese Application No. 2008-170317.

* cited by examiner

*Primary Examiner* — Sean Kayes
(74) *Attorney, Agent, or Firm* — Holtz, Holtz, Goodman & Chick

(57) ABSTRACT

Disclosed is a time code discrimination apparatus that discriminates a time code including one-minute digit and ten-minute digit codes. The time code discrimination apparatus includes: a first code acquiring section to acquire a plurality of sets of one-minute digit codes at a time interval in which the plurality of sets of one-minute digit codes are equal in value of one-minute digit; and a first code discrimination section to execute a process of reducing erroneous discrimination on the plurality of sets of one-minute digit codes acquired by the first code acquiring section, and to discriminate the one-minute digit codes.

5 Claims, 11 Drawing Sheets

FIG. 5

| MIN | MINUTE CODE VALUE | | | | | | | | | |
|---|---|---|---|---|---|---|---|---|---|---|
| | 0 SEC | 1 SEC | 2 SEC | 3 SEC | 4 SEC | 5 SEC | 6 SEC | 7 SEC | 8 SEC | 9 SEC |
| 0 | M | 0 | 0 | 0 | 0 | 0 | 0 | 0 | 0 | P |
| 1 | M | 0 | 0 | 0 | 0 | 0 | 0 | 0 | 1 | P |
| 2 | M | 0 | 0 | 0 | 0 | 0 | 0 | 1 | 0 | P |
| 3 | M | 0 | 0 | 0 | 0 | 0 | 0 | 1 | 1 | P |
| 4 | M | 0 | 0 | 0 | 0 | 0 | 1 | 0 | 0 | P |
| 5 | M | 0 | 0 | 0 | 0 | 0 | 1 | 0 | 1 | P |
| 6 | M | 0 | 0 | 0 | 0 | 0 | 1 | 1 | 0 | P |
| 7 | M | 0 | 0 | 0 | 0 | 0 | 1 | 1 | 1 | P |
| 8 | M | 0 | 0 | 0 | 0 | 1 | 0 | 0 | 0 | P |
| 9 | M | 0 | 0 | 0 | 0 | 1 | 0 | 0 | 1 | P |
| 10 | M | 0 | 0 | 1 | 0 | 0 | 0 | 0 | 0 | P |
| 11 | M | 0 | 0 | 1 | 0 | 0 | 0 | 0 | 1 | P |
| 12 | M | 0 | 0 | 1 | 0 | 0 | 0 | 1 | 0 | P |
| 13 | M | 0 | 0 | 1 | 0 | 0 | 0 | 1 | 1 | P |
| 14 | M | 0 | 0 | 1 | 0 | 0 | 1 | 0 | 0 | P |
| 15 | M | 0 | 0 | 1 | 0 | 0 | 1 | 0 | 1 | P |
| 16 | M | 0 | 0 | 1 | 0 | 0 | 1 | 1 | 0 | P |
| 17 | M | 0 | 0 | 1 | 0 | 0 | 1 | 1 | 1 | P |
| 18 | M | 0 | 0 | 1 | 0 | 1 | 0 | 0 | 0 | P |
| 19 | M | 0 | 0 | 1 | 0 | 1 | 0 | 0 | 1 | P |
| 20 | M | 0 | 1 | 0 | 0 | 0 | 0 | 0 | 0 | P |
| 21 | M | 0 | 1 | 0 | 0 | 0 | 0 | 0 | 1 | P |
| 22 | M | 0 | 1 | 0 | 0 | 0 | 0 | 1 | 0 | P |
| 23 | M | 0 | 1 | 0 | 0 | 0 | 0 | 1 | 1 | P |
| 24 | M | 0 | 1 | 0 | 0 | 0 | 1 | 0 | 0 | P |
| 25 | M | 0 | 1 | 0 | 0 | 0 | 1 | 0 | 1 | P |
| 26 | M | 0 | 1 | 0 | 0 | 0 | 1 | 1 | 0 | P |
| 27 | M | 0 | 1 | 0 | 0 | 0 | 1 | 1 | 1 | P |
| 28 | M | 0 | 1 | 0 | 0 | 1 | 0 | 0 | 0 | P |
| 29 | M | 0 | 1 | 0 | 0 | 1 | 0 | 0 | 1 | P |
| 30 | M | 0 | 1 | 1 | 0 | 0 | 0 | 0 | 0 | P |
| ⋮ | | | | | | | | | | |
| 50 | M | 1 | 1 | 0 | 0 | 0 | 0 | 0 | 0 | P |
| 51 | M | 1 | 1 | 0 | 0 | 0 | 0 | 0 | 1 | P |
| 52 | M | 1 | 1 | 0 | 0 | 0 | 0 | 1 | 0 | P |
| 53 | M | 1 | 1 | 0 | 0 | 0 | 0 | 1 | 1 | P |
| 54 | M | 1 | 1 | 0 | 0 | 0 | 1 | 0 | 0 | P |
| 55 | M | 1 | 1 | 0 | 0 | 0 | 1 | 0 | 1 | P |
| 56 | M | 1 | 1 | 0 | 0 | 0 | 1 | 1 | 0 | P |
| 57 | M | 1 | 1 | 0 | 0 | 0 | 1 | 1 | 1 | P |
| 58 | M | 1 | 1 | 0 | 0 | 1 | 0 | 0 | 0 | P |
| 59 | M | 1 | 1 | 0 | 0 | 1 | 0 | 0 | 1 | P |

R0 Q0 R1 Q1 R2 Q2 R5 Q5

TIME CODE DISCRIMINATION APPARATUS AND WAVE CLOCK

CROSS-REFERENCE TO RELATED APPLICATIONS

This application is based upon and claims the benefit of priority from the prior Japanese Patent Application No. 2008-170317, filed on Jun. 30, 2008, the entire contents of which are incorporated herein by reference.

BACKGROUND OF THE INVENTION

1. Field of the Invention

The present invention relates to a time code discrimination apparatus that discriminates a time code and a wave clock that receives a standard radio wave to discriminate a time code.

2. Description of Related Art

In recent years, wave clocks that receive a time code and automatically correct time of an internal clock have been used. The time code is transmitted by performing the amplitude modulation (AM) on a carrier wave of 40 kHz or 60 kHz. If radio wave conditions are bad, a signal waveform of the received, time code may be collapsed, and it may be difficult to discriminate the time code.

As techniques for receiving and discriminating the time code, a technique for receiving only partial data of a time code and correcting time at a high speed (for example, refer to U.S. Pat. No. 7,411,870) or a technique for adjusting a threshold level to discriminate a time code signal and enabling accurate reproduction, of a time code even though radio wave conditions are poor (for example, refer to Japanese Patent Application Laid-Open No. 2007-139705 and U.S. Pat. No. 7,428,190) have been proposed.

Although the conventional technique for receiving and discriminating a time code can improve the sensitivity slightly, the conventional technique cannot improve the sensitivity to such a degree that accurate discrimination of the time code can be achieved under the condition that a signal is greatly attenuated and a noise ratio is increased, such as in a building.

Further, if the normal discrimination of the rime code is not performed, reception of the time code is performed several times. As a result, power consumption is increased.

SUMMARY OF THE INVENTION

It is, therefore, a main object of the preset invention to provide a time code discrimination apparatus and a wave clock that can accurately discriminate a reproduced time code to achieve accurate time correction even under poor radio wave conditions.

According to a first aspect of the present invention, there is provided a time code discrimination apparatus that discriminates a time code including one-minute digit and ten-minute digit codes, the time code discrimination apparatus including: a code acquiring section to acquire a plurality of sets of one-minute digit codes at a time interval in which the plurality of sets of one-minute digit codes are equal in value of one-minute digit; and a code discrimination section to execute a process of reducing erroneous discrimination on the plurality of sets of one-minute digit codes acquired by the code acquiring section, and to discriminate the one-minute digit codes.

According to a second aspect of the present invention, there is provided a time code discrimination apparatus that discriminates a time code including one-minute digit and ten-minute digit codes, the time code discrimination apparatus including: a code acquiring section to acquire a plurality of sets of one-minute digit codes at a time interval during which one-minute digit values of the one-minute digit codes are varied with a predetermined pattern; and a code discrimination section to calculate a correlation between the plurality of sets of one-minute digit codes acquired by the code acquiring section and a transition pattern of an original one-minute digit code while shifting comparison positions to detect which position in the transition pattern the plurality of sets of one-minute digit codes correspond to, and to discriminate the acquired one-minute digit code based on the correlation.

According to a third aspect of the present invention, there is provided a wave clock, including: a radio wave receiving unit to receive a standard radio wave and demodulate a time code; and the time code discrimination apparatus to discriminate the time code.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 is a chart indicating time-series data values of minute codes in a time code for 60 frames;

DETAILED DESCRIPTION OF THE PREFERRED EMBODIMENT

Reference will now be made in detail to preferred embodiments of the present invention as illustrated in the accompanying drawings.

First Embodiment

Figure 1:
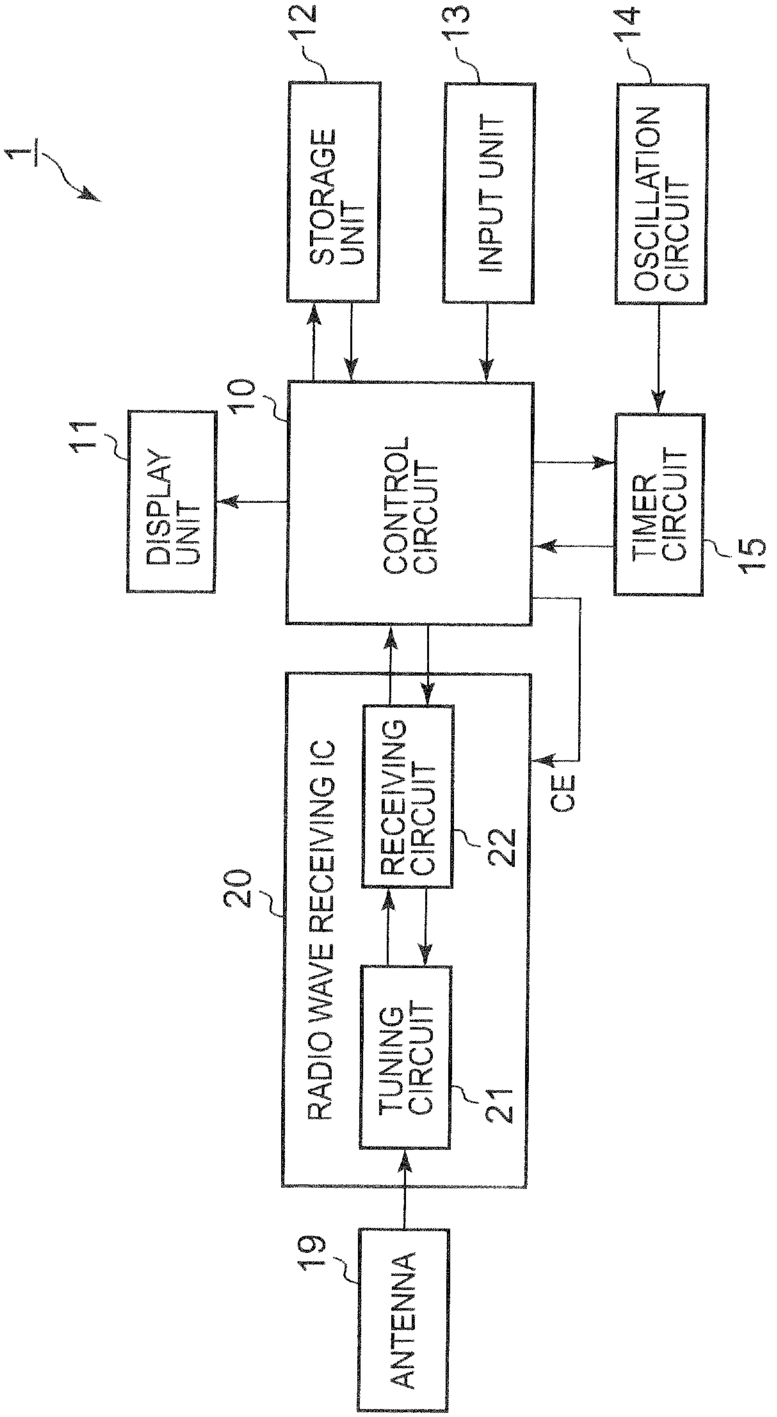
FIG. 1 is a block diagram illustrating an internal configuration of a wave clock according to preferred embodiments of the present invention.

FIG. 1 is a block diagram illustrating an internal configuration of a wave clock according to the preferred embodiments of the present invention.

A wave clock 1 according to this embodiment is a body of a wristwatch, and has a function of receiving a standard radio wave and automatically correcting time using a time code. The wave clock 1 includes a display unit 11 that performs time display, a control circuit 10 that performs whole control of the apparatus, a storage unit 12 that stores control data or a control program, an input unit 13 that has a plurality of operation buttons, a timer circuit 15 that clocks time, an oscillation circuit 14 that supplies a predetermined frequency signal to the timer circuit 15, an antenna 19 that receives the standard radio wave, and a radio wave receiving IC 20 that receives the standard radio wave and demodulates the time code.

The control circuit 10 is composed of a microcomputer, and includes an AD converter that performs an AD conversion on a received signal transmitted from the radio wave receiving IC 20 and inputs a converted signal, a CPU (Central Processing Unit) that executes the control program, a RAM (Random Access Memory) that supplies a memory area for work to the CPU, and an I/O circuit that inputs and outputs signals with the individual units.

The radio wave receiving IC 20 includes a tuning circuit 21 that switches a frequency of the received standard radio wave and a receiving circuit 22 that receives a radio wave and executes a demodulating process on the time code. The receiving circuit 22 has an amplifier that amplifies the received signal, an automatic gain control circuit that performs gain control, a filter circuit that removes a noise component from the received signal, and a detection circuit that demodulates the time code.

The radio wave receiving IC 20 is configured to receive an enable signal CE from the control circuit 10 and operate. When the enable signal CE becomes have an invalid value and enters in a non-operation state, supply of a power supply voltage to the individual units is stopped, and power consumption is decreased.

Next, reference will be made to the operation of a time correction processing in the wave clock 1 according to this embodiment.

Figure 2:
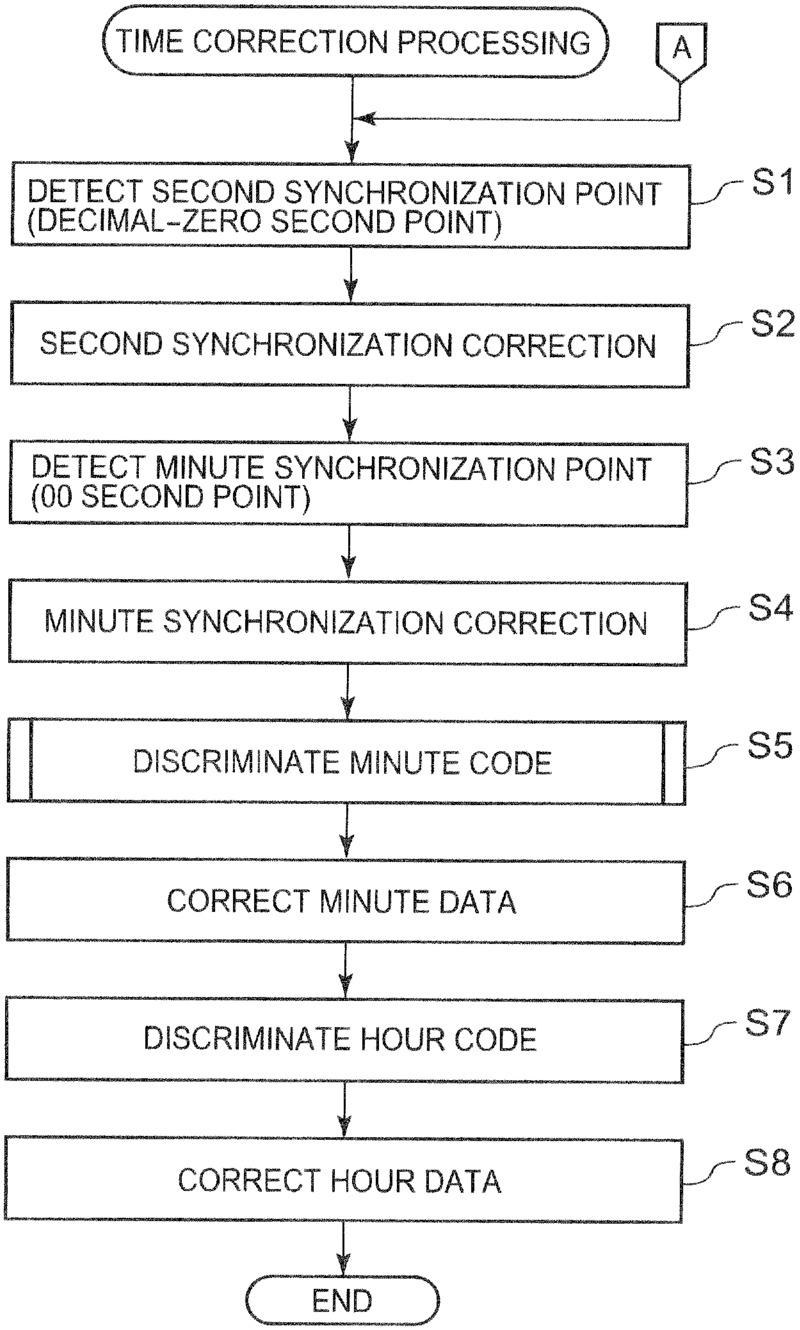
FIG. 2 is a flowchart illustrating a time correction processing executed by a control circuit.
Figure 10:
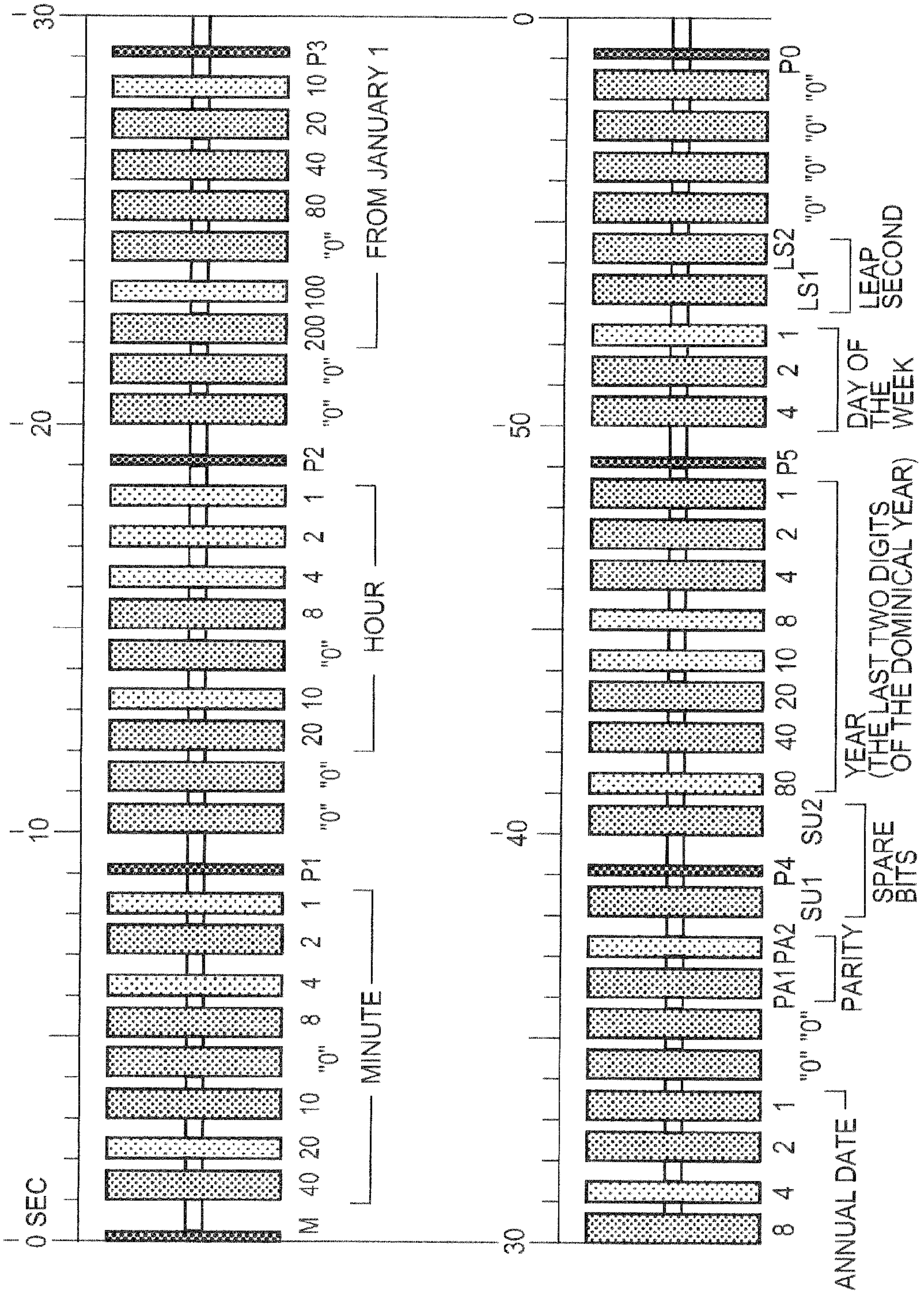
FIG. 10 is a format diagram illustrating an example of a time code.
Figure 11A:
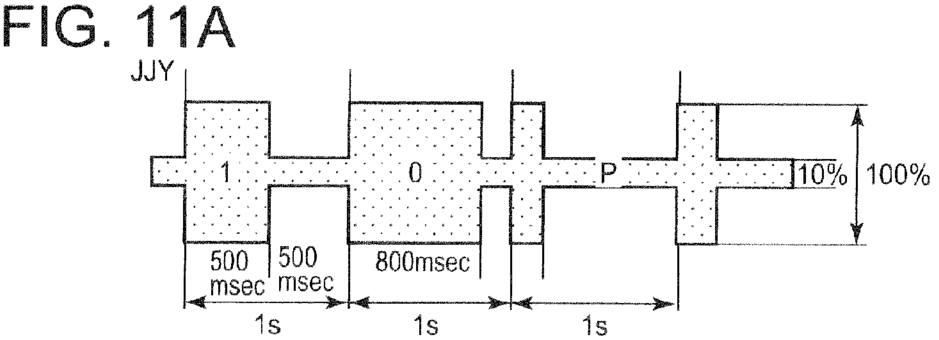
FIG. 11A shows waveforms of data pulses constituting a time code in Japan.
Figure 11B:
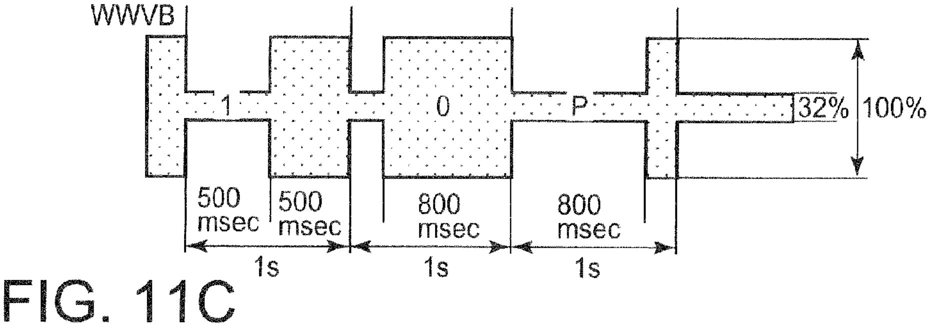
FIG. 11B shows waveforms of data pulses constituting a time code in United States of America.
Figure 11C:
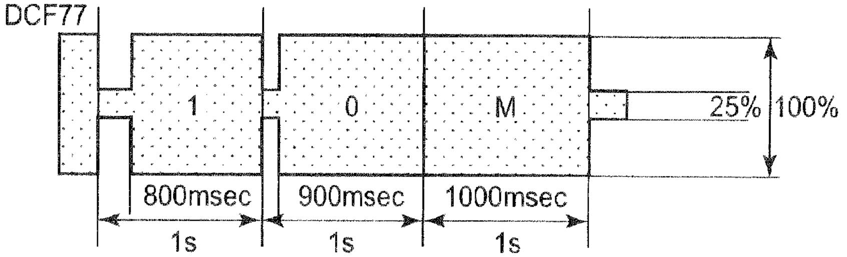
FIG. 11C shows waveforms of data pulses constituting a time code in Germany.
Figure 11D:
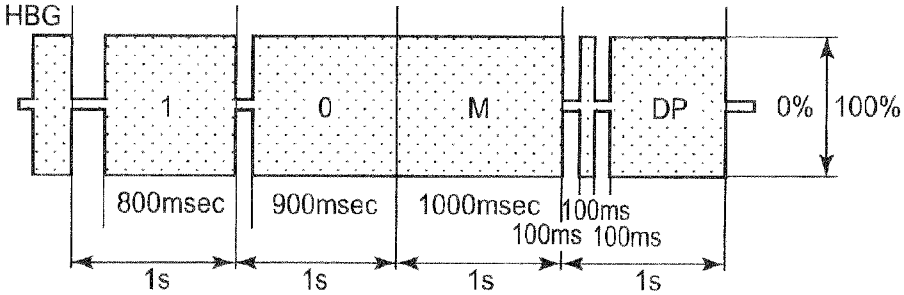
FIG. 11D shows waveforms of data pulses constituting a time code in Switzerland.
Figure 11E:
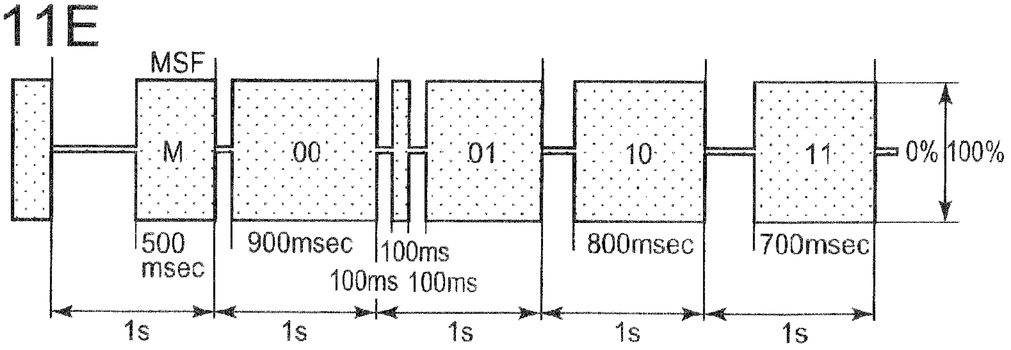
FIG. 11E shows waveforms of data pulses constituting a time code in United Kingdom.

FIG. 2 is flowchart illustrating a time correction processing executed by the control circuit 10. FIG. 10 is a format diagram illustrating an example of a time code of Japan.

The time correction processing starts when current time becomes preset time for time correction, a predetermined operation is input, or a battery is exchanged. The time correction processing shown in FIG. 2 may be executed only when a radio wave situation is bad and an error is generated in normal time code reproduction by a common radio wave receiving process.

In Step S1 of the time correction processing shown in FIG. 2, the control circuit 10 causes the receiving circuit 22 to receive a standard radio wave and reproduce a time code signal, and detects a second synchronization point in the reproduced time code signal. The second synchronization point is a decimal-zero second point of each second, such as 0.0 second, 1.0 second, . . . , and 59.0 seconds. As shown in the format diagram of the time code of FIG. 10, in the time code of Japan, a rising point of each data pulse that constitutes the time code corresponds to a second synchronization point.

Figure 8:
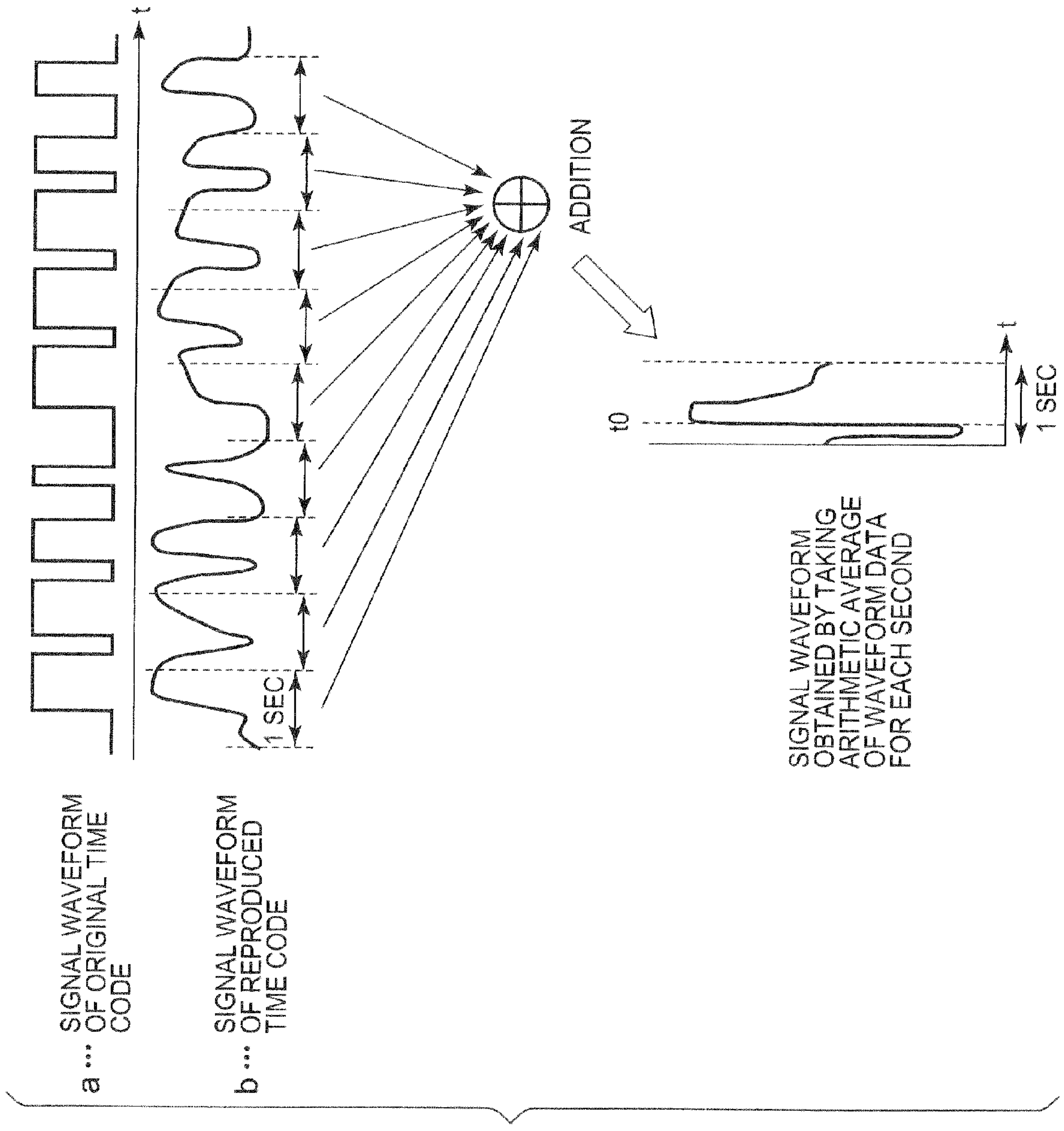
FIG. 8 is a diagram illustrating an example of a method of detecting a second synchronization point.

FIG. 8 shows an example of a method of detecting a second synchronization point. FIG. 8-(*a*) shows a signal waveform of an original time code. FIG. 8-(*b*) shows a signal waveform of a reproduced time code of a standard radio wave received by the radio wave receiving IC 20 under poor radio wave conditions, and a signal waveform obtained by taking the arithmetic average of the reproduced signal waveform.

No particular restriction is put on a method of detecting the second synchronization point, but the following method can be employed.

In Step S1, the control circuit 10 causes the receiving circuit 22 to reproduce the time code for a plurality of seconds (for example, 8 to 30 seconds) and performs an analog to digital conversion of a plurality of the reproduced data pulse waveforms to acquire the data pulse waveforms at a predetermined sampling frequency, as shown in FIG. 8-(*b*). As shown by dotted lines in FIG. 8-(*b*), the control circuit 10 divides this sampling data into a plurality of sets of waveform data at a time interval of one second using arbitrary timing as a start point. The control circuit 10 calculates the arithmetic average of the sets of waveform data by superposing the plurality of sets of waveform data.

As shown in FIG. 8-(*b*), since the waveform data after the arithmetic average corresponds to the superposition of the plurality of data pulses that are divided at a time interval of one second using arbitrary timing as a start point, a steep rising portion can be found in the waveform at one point t0. Further, since a noise component is removed around the rising portion due to the arithmetic average, it is possible to obtain waveform data whose rising portion is clearly shown at the point t0. Accordingly, by detecting the point t0 at which a value of the waveform data after the arithmetic average is sharply changed from lower values to higher values, the point t0 can be detected as a second synchronization point.

When the second synchronization point is detected, the control circuit 10 performs second synchronization correction so as to adjust a decimal-zero second point of the timer circuit 15 to the second synchronization point in Step S2.

Next, in Step S3, the control circuit 10 causes the receiving circuit 22 to receive a standard radio wave and reproduce a time code signal, and detects a minute synchronization point in the reproduced time code signal. The minute synchronization point is a 00 second point corresponding to a frame start point of the time code. As shown in the format diagram of the tame code of FIG. 10, the 00 second point is set within a range where two pulses each having 0.2 second width appear continuously. The two pulses correspond to a position marker pulse P0 and a marker pulse M.

Figure 9:
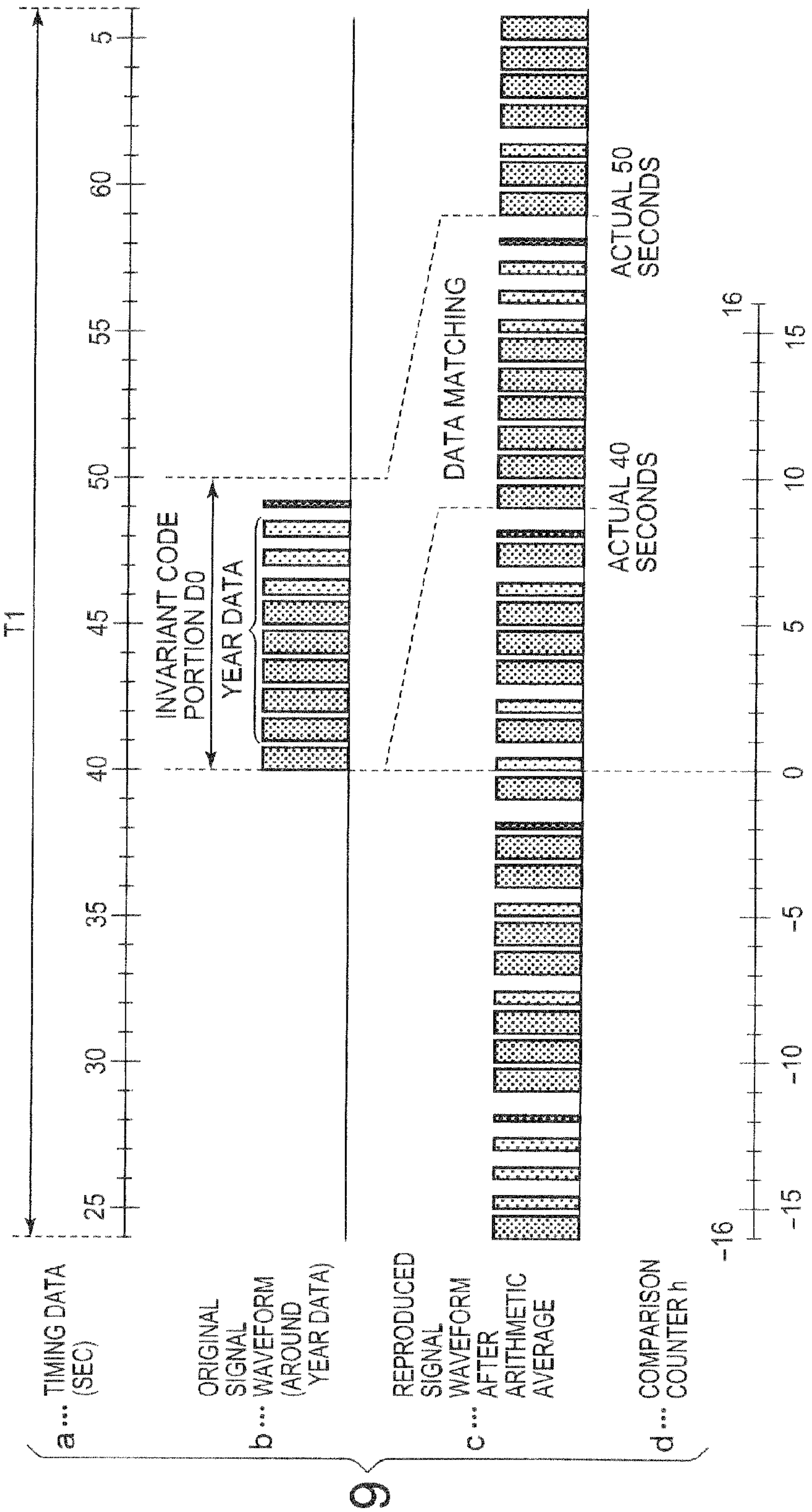
FIG. 9 is a diagram illustrating an example of a method of detecting a minute synchronization point.

FIG. 9 is a diagram illustrating an example of a method of detecting a minute synchronization point. FIG. 9-(*a*) shows timing data of the timer circuit 15. FIG. 9-(*b*) shows a signal waveform of a portion of a time code signal as a target for comparison. FIG. 9-(*c*) shows a signal waveform of a reproduced time code signal after taking the arithmetic average of the time code signal. FIG. 9-(*d*) shows values of a comparison counter h indicating comparison positions.

No particular restriction is put on a method of detecting the minute synchronization point, but the following method can be employed.

In Step S3, the control circuit 10 causes the receiving circuit 22 to receive the standard radio wave and reproduce the time code a plurality of times for a period T1 during which reception of a predetermined invariant code portion D0 is anticipated.

As the predetermined invariant code portion D0, a year data portion that appears in 40 to 50 seconds of the time code may be employed as shown in FIG. 9-(*b*) if the year data portion is not a bridge portion from one year to the next. A portion of the marker pulses P0 and M that appear between 59 seconds and 00 second of the time code may also be employed as the predetermined invariant code portion D0.

Further, the period T1 (refer to FIG. 9-(*a*)) during which the reception of the invariant code portion D0 is anticipated can be calculated as a period that is obtained by adding maximum error time of the timer circuit 15 to the anterior and the posterior of a period during which the invariant code portion D0 is transmitted. For example, the maximum error time of the timer circuit 15 can be calculated from the number of dates from a point of time of the previous time correction processing to a current point of time and a maximum error of the timer circuit 15. If the maximum error is calculated as 16 seconds, the maximum error (16 seconds) is added to the anterior and the posterior of a transmission period (40 to 50 seconds) of the peripheral portion of the year data, and the time code is received and reproduced during a period T1 of 6 to 24 seconds indicated by the timer circuit 15. In this case, a code portion of the year data is essentially included. Alternatively, when the portions of the marker pulses P0 and M are used as the invariant code portion D0, if the time code is received during a period of 17 to 43 seconds indicated by the timer circuit 15, the code portions of the marker pulses P0 and M are essentially included during the period. When the error time of the timer circuit 15 is unclear in the time correction processing after the battery is exchanged, the time codes of all periods are received a plurality of times.

After receiving the time code for the period T1 a plurality of times, the arithmetic average of waveform data of the time code signals for the plurality of times is calculated as shown in FIG. 9-(*c*). By the arithmetic average, a noise component is removed around the predetermined invariant code portion D0, and waveform data whose signal waveform in the predetermined code portion is clearly shown is obtained. A data matching process may be executed to detect a timing position of the invariant code portion D0 in the signal waveform after the arithmetic average (FIG. 9-(*c*)), thereby determining the reception timing of the code portion D0. The timing of the minute synchronization point (00 second) can be obtained by an inverse operation from the reception timing.

The data matching process is a process for calculating a correlation between original waveform data (FIG. 9-(*b*)) of the invariant code portion D0 and the waveform data of the time code after the arithmetic average during a period T1 (FIG. 9-(*c*)) while shifting comparison positions at a time interval of one second, and determining a comparison position where the highest correlation is obtained. In the example of FIG. 9, while shifting the comparison positions one second by one second from "−16 second point" of a comparison counter h, the original waveform data of the code portion D0 is compared with the waveform data of the time code after the arithmetic average during a period T1 to calculate the correlation. The highest correlation is obtained at "9 second point" of the comparison counter h, and it is possible to determine that the time code of the code portion D0 is actually received at the corresponding point of time.

When a value of the timer circuit 15 is at a position in a range of 49 to 59 seconds, the code portion D0 that is actually transmitted at 40 to 50 seconds can be detected. This shows that a value of the timer circuit 15 is 9 seconds ahead of time. Accordingly, a point of time when the timer circuit 15 shows 09 second can be detected as an actual minute synchronization point (00 second).

As described above, when the minute synchronization point is detected, the control circuit 10 performs minute synchronization correction so as to adjust the timing of 00 second of the timer circuit 15 to the minute synchronization point in Step S4.

Because the data of second of the timer circuit 15 is changed into an accurate value by the second synchronization correction in Step S2 and the minute synchronization correction in Step S4, the control circuit 10 can recognize which code portion in the time code is to be reproduced during which period, based on the timing data of the timer circuit 15.

Next, the following steps (which will hereinafter be described in detail) are executed: a discrimination processing of minute data that is arranged in 1 to 8 seconds of a time code (Step S5); a correction processing of minute data of the timer circuit 15 (Step S6); a discrimination processing of hour data that is arranged in 12 to 18 seconds of the time code (Step S7); and a correction processing of hour data of the timer circuit 15 (Step S8). Then the time correction processing is terminated. By executing these steps, the hour, minute, and second data of the timer circuit 15 can be adjusted to the current time data represented by the time code.

Next, reference will be made in detail to the discrimination processing of minute data in Step S5.

Figure 3:
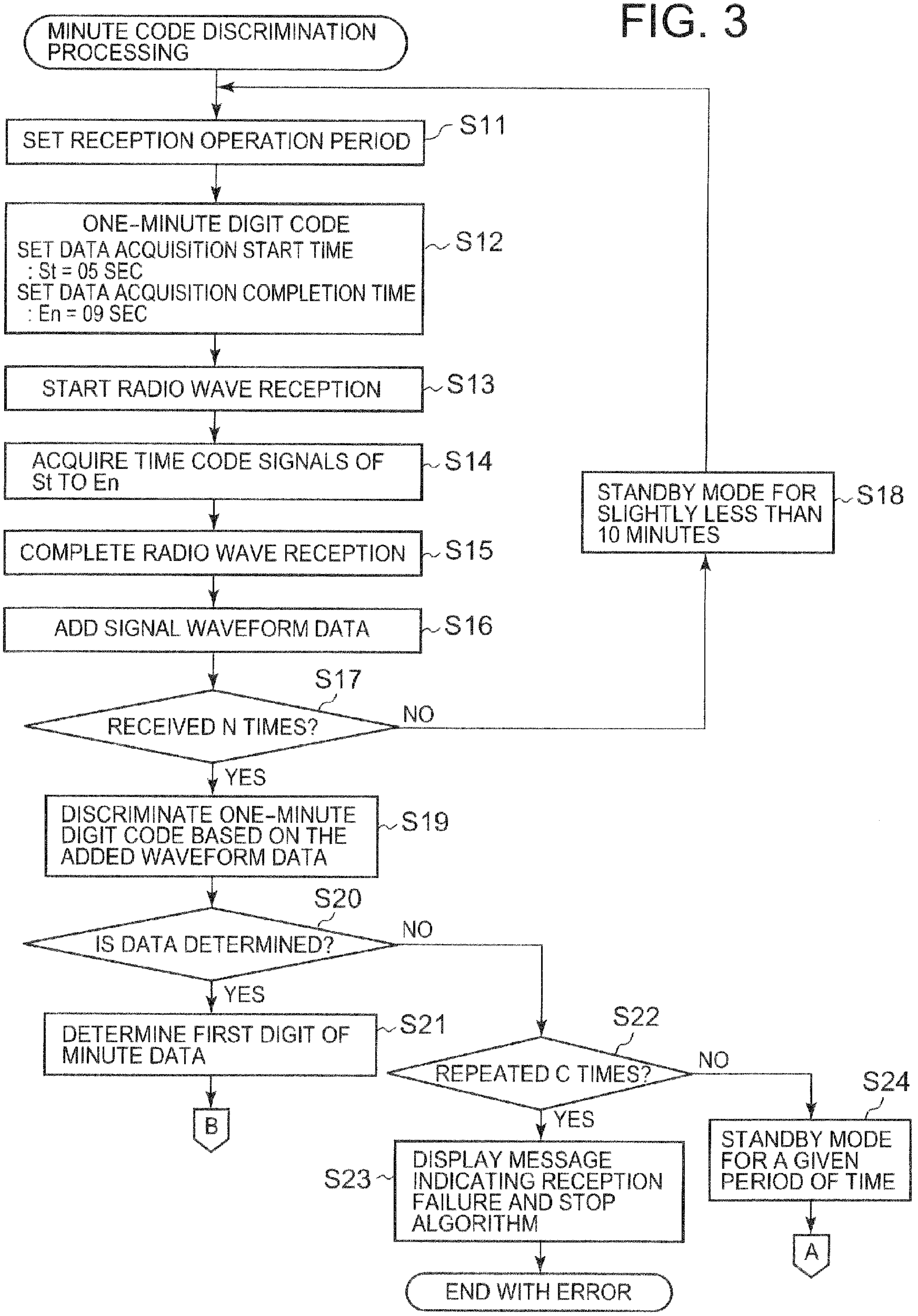
FIG. 3 is a first half of a flowchart of a discrimination processing of minute data that is executed in Step S5 of FIG. 2.
Figure 4:
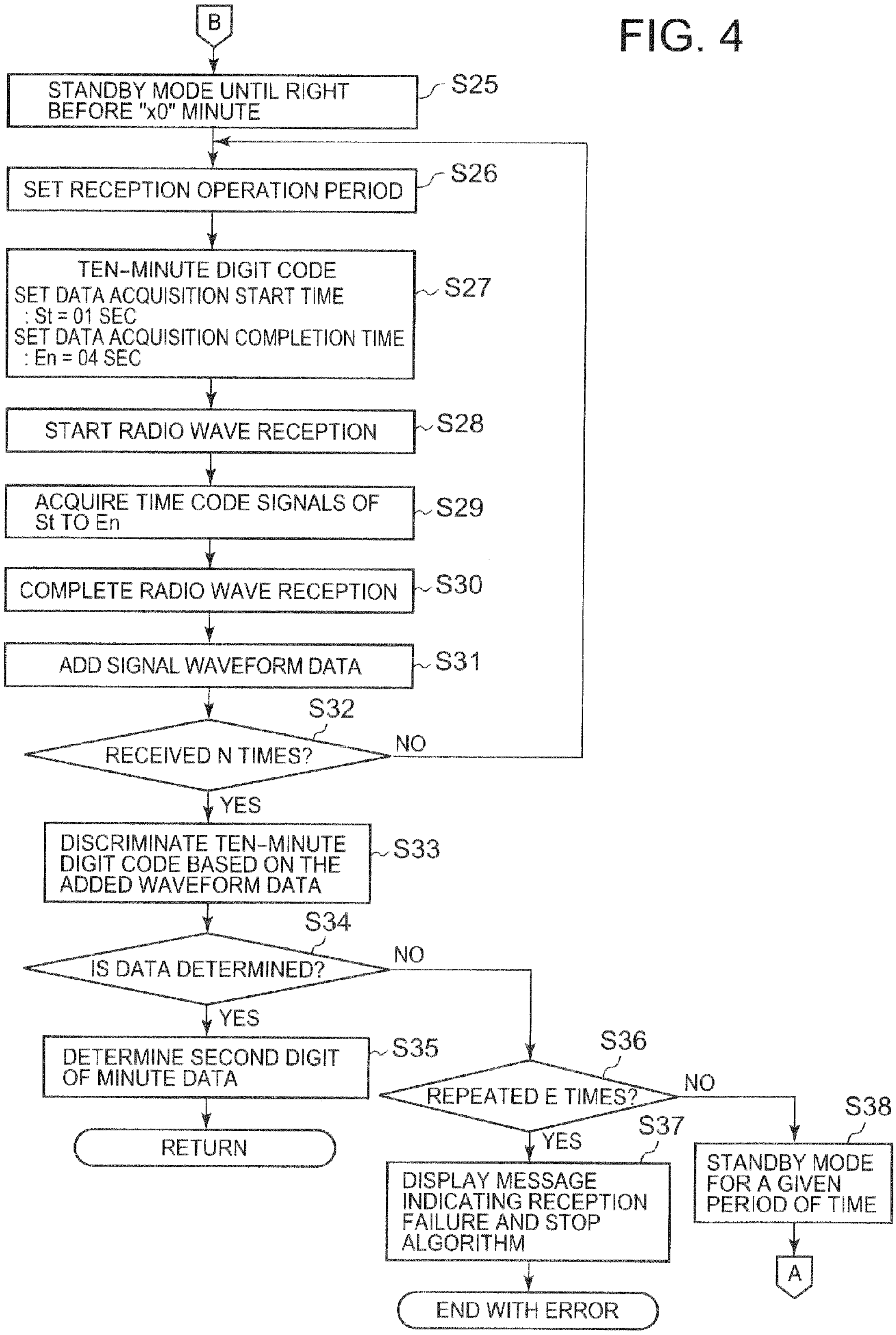
FIG. 4 is a second half of the flowchart of the discrimination processing of the minute data that is executed in Step S5 of FIG. 2.

FIGS. 3 and 4 are flowcharts of the discrimination processing of minute data that is executed in Step S5 of FIG. 2. FIG. 5 is a chart indicating time-series minute code values in a time code for 60 frames.

The discrimination processing of minute data includes the steps of: acquiring a plurality of sets of partial codes in the time code which indicate an one-minute digit data value, at a time interval of 10 minutes in which the plurality of sets of partial codes are equal in value of one-minute digit; taking the arithmetic average of waveform data of the plurality of sets of partial codes; discriminating the one-minute digit codes accurately based on the averaged waveform data; acquiring a plurality of sets of partial codes in the time code which indicate an ten-minute digit data value, at a time interval of one minute during a period of x0 to x9 minutes (x is an arbitrary value of a ten-minute digit) during which ten-minute digit values are kept invariant; taking the arithmetic average of waveform data of the plurality of sets of partial codes; and discriminating the ten-minute digit code accurately based on the averaged waveform data.

Specifically, as shown in FIG. 3, if the control circuit 10 proceeds to the minute code determining process, first, the control circuit 10 sets a period where the radio wave receiving IC 20 is operated (Step S11), and sets acquisition start timing St and acquisition completion timing En of the reproduced time code signal to acquire the code of the one-minute digit (Step S12). Since the code of the one-minute digit is arranged in code portions of 05 to 08 seconds of the time code, the CPU of the control circuit 10 sets the acquisition start timing St as 0.5 second and the acquisition completion timing En as 0.9 second. The operation period of the radio wave receiving IC 20 is set such that reproduction of the time code signal is enabled at timings St to En.

Next, the control circuit 10 operates the radio wave receiving IC 20 in accordance with the setting of Steps S11 and S12 (Step S13), performs an AD conversion on the time code signals demodulated by the radio wave receiving IC 20 at the timings Sn to En, and acquires the converted time code signals as waveform data (Step S14). After acquiring the waveform data, the control circuit 10 stops the operation of the radio wave receiving IC 20 (Step S15). By these processes, one set of waveform data of the one-minute digit code in the time code of one frame is acquired.

When one set of waveform data is acquired, the acquired one set of waveform data is added to a variable arrangement for average value calculation in order to calculate the arithmetic average of a plurality of sets of waveform data (Step S16). That is, by using the variable arrangement corresponding to individual timing of sampling data during 0.5 to 0.9 seconds, the time-series sampling data (waveform data) is added to the variable arrangement without changing a start point.

After the waveform data is added, the control circuit 10 checks whether the data acquisition for N times (for example, 10 times) is completed (Step S17). If the data acquisition for N times is not completed, a standby mode for slightly less than 10 minutes occurs in order to acquire an one-minute digit code after 10 minutes (Step S18), and the algorithm returns to Step S11. If the data acquisition for N times has ended, the algorithm proceeds to Step S19.

By repeating Steps S11 to S18 N times, N sets of waveform data of one-minute digit code, which are received at a time interval of 10 minutes and whose values are identical to each other, can be acquired, and a data arrangement obtained by superposing these sets of waveform data can also be acquired.

As shown in dotted frames Q0 to Q5 of the chart of FIG. 5, the codes of 05 to 08 seconds indicating one-minute digit values in the minute codes are varied with a predetermined pattern over x0 to x9 minutes (x is an arbitrary value of a ten-minute digit), but in a 10 minute cycle, the same code repetitively appears. Accordingly, N sets of waveform data acquired in Steps S11 to S18 show the same code pattern. Further, if N sets of waveform data are added by superposing the waveform data, a noise component in the waveform data can be removed, and accurate waveform data of one-minute digit code whose noise has been removed can be obtained.

The degree of noise reduction is as follows. Suppose that 10 sets of waveform data are added, and noise is random and effective values of the noise are equal to each other. S/N ratio ($S/N_n$) is given by the following equation:

$$\frac{S}{N_n} = \frac{(d_1 + d_2 + \ldots + d_{10})}{\sqrt{N_1^2 + N_2^2 + \ldots + N_{10}^2}} = \frac{10d}{\sqrt{10N^2}} = \frac{\sqrt{10}\,d}{N}$$

where dp (p=1, . . . , 10) corresponds to a received signal, and Np (p=1, . . . , 10) corresponds to noise. That is, a signal level of the added waveform data is increased by 10 times, and a noise level corresponds to square root sum of noise. Accordingly, waveform data whose S/N ratio is improved by a "square root of 10" can be obtained. Therefore, it is possible to obtain the same effect as sensitivity improvement of 10 dB.

When the addition of the waveform data for N times is completed, the one-minute digit code in the added waveform data is discriminated (Step S19). As described above, since S/N ratio of the added waveform data is improved, an accurate discrimination of the one-minute digit code can be achieved by recognizing a pulse width of each data pulse in the one-minute digit code.

Next, the control circuit 10 checks whether the code discrimination is determined in the discrimination process of Step S19 or the code discrimination cannot be determined due to an unclear data pulse (Step S20). If the code discrimination is determined, the determined data is reflected in the one-minute digit value of the internal counter (Step S21), for example, and the algorithm proceeds to the discrimination process of the ten-minute digit data as shown in FIG. 4.

If the code discrimination is not determined, the algorithm proceeds to Step S22 to check whether an error is repeated C times (for example, three times). If the error is repeated C times, the control circuit 10 causes the display unit 11 to display a message indicating reception failure and stops the algorithm of the time correction processing (Step S23), and terminates this control processing with error. If the error is not repeated C times, a standby mode for a given period of time occurs in order to execute the receiving process again after 30 minutes or one hour, for example (Step S24), and the algorithm returns to Step S1 in the time correction processing of FIG. 2.

Next, reference will be made to accurate discrimination of a ten-minute digit code. In the data discrimination process of the ten-minute digit code of FIG. 4, first, the control circuit 10 remains in a standby mode until right before x0 minute (x is an arbitrary value of a ten-minute digit), on the basis of the data value of the one-minute digit determined in Step S21, such that the reception of ten-minute digit codes starts at x0 minute (Step S25).

Next, the control circuit 10 sets a period where the radio wave receiving IC 20 is operated (Step S26), and sets acquisition start timing St and acquisition completion timing En of the code in order to acquire the code of the ten-minute digit (Step S27). Since the code of the ten-minute digit is arranged in code portions of 01 to 03 seconds of the time code, the CPU of the control circuit 10 sets the acquisition start timing St as 01 second and the acquisition completion timing En as 03 second. The period where the radio wave receiving IC 20 is operated is set such that reproduction of the time code signal is enabled at timings St to En.

Next, the control circuit 10 operates the radio wave receiving IC 20 in accordance with the setting of Steps S26 and S27 (Step S28), performs an AD conversion on the time code signals demodulated by the radio wave receiving IC 20 at the timings St to En, and acquires the converted time code signals as waveform data (Step S29). When the control circuit 10 acquires the waveform data, the control circuit 10 stops the operation of the radio wave receiving IC 20 (Step S30). By these processes, one set of waveform data of ten-minute digit code in the time code signal is acquired.

When one set of waveform data is acquired, the acquired one set of waveform data is added to a variable arrangement for average value calculation in order to calculate the arithmetic average of a plurality of sets of waveform data (Step S31). After the waveform data is added, the control circuit 10 checks whether data acquisition for N times (for example, 8 to 10 times) is completed (Step S32). If the data acquisition for N times is not completed, the algorithm returns to Step S26 in order to acquire a ten-minute digit code in the next time code. If the data acquisition for N times is completed, the algorithm proceeds to Step S33.

By the loop process of Steps S26 to S32, N sets of waveform data of ten-minute digit code, which are received and reproduced at a time interval of one minute from x0 minute, can be acquired, and a data arrangement obtained by superposing these sets of waveform data can also be acquired.

As shown in dotted frames R0 to R5 of the chart of FIG. 5, the codes of 01 to 03 seconds indicating values of ten-minute digit in the minute codes are varied for every 10 minutes, but in a range of x0 to x9 minutes (x is an arbitrary value of a ten-minute digit), the ten-minute digit values are identical to each other, and the same code repetitively appears. Accordingly, 10 sets of waveform data that are received at a time interval of one minute from x0 minute are waveform data of the same code. If these sets of waveform data are added by superposing the waveform data, a noise component in the waveform data can be removed, and accurate waveform data of ten-minute digit code whose noise has been removed can be obtained.

When the addition of the waveform data for N times is completed, the ten-minute digit code in the added waveform data is discriminated (Step S33). Since S/N ratio of the added waveform data is improved, an accurate determination of the ten-minute digit code can be achieved by recognizing a pulse width of each data pulse in the ten-minute digit code.

Next, the control circuit 10 checks whether the code discrimination is determined in the discrimination process of Step S33 or the code discrimination cannot be determined due to an unclear data pulse (Step S34). If the code discrimination is determined, the algorithm proceeds to Step S35. In Step S35, the value of the ten-minute digit code is reflected in the value of the ten-minute digit of the internal counter, for example, and then the minute code discrimination processing is ended.

If the code discrimination is not determined, the algorithm proceeds to Step S36 to check whether an error is repeated E times (for example, three times). If the error is repeated E times, the control circuit 10 causes the display unit 11 to display a message indicating reception failure and stops the algorithm of the time correction processing (Step S37), and terminates the minute code discrimination processing with error. If the error is not repeated E times, a standby mode for a given period of time occurs in order to execute the receiving process again (Step S38), and the algorithm returns to Step S1 in the time correction processing of FIG. 2.

The above-described minute code discrimination processing makes it possible to accurately correct the minute data of the timer circuit 15 by accurately discriminating the one-minute digit code and the ten-minute digit code, even under poor radio wave conditions.

Next, reference will be made in detail to the discrimination processing of hour data in Step S7 of FIG. 2.

The determining process of the hour data can be realized by almost the same process as the determining process of the ten-minute digit code of FIG. 4. That is, since the minute data becomes an accurate value by the minute code determining process and the minute data correction processing (Steps S6 and S7 of FIG. 2), the control circuit 10 calculates a period (for example, x0 to x9 minutes) where an hour code becomes the same code, on the basis of the minute data. The control circuit 10 acquires a plurality of sets of waveform data of the hour code during the corresponding period, calculates the arithmetic average, and generates accurate waveform data of the hour code where a noise has been removed. If the control circuit 10 generates the accurate waveform data of the hour code, the control circuit 10 performs accurate discrimination of the hour code, on the basis of the waveform data.

This hour code discrimination processing makes it possible to accurately correct the hour data of the timer circuit 15 by accurately discriminating the hour code even under poor radio wave conditions.

Although not described in the time correction processing of FIG. 2, discrimination of a code indicating a year, a month, and a date or a correction processing of a code indicating a year, a month, and a date or a day of the week of the timer circuit 15 can be realized by the same method as the hour data process.

As such, according to the time code discrimination apparatus (the control circuit 10, the storage unit 12, and the timer circuit 15) and the wave clock 1 according to this embodiment, the one-minute digit codes of the plurality of sets that become have the same value are acquired, and a process of removing an influence due to a noise from the plurality of sets of one-minute digit codes (process of calculating an arithmetic average) is executed and a code value is determined. Therefore, even under poor radio wave conditions, it is possible to perform accurate code discrimination of the one-minute digit.

Further, during the period when the ten-minute digit codes are kept invariant on the basis of the discrimination of the one-minute digit, the plurality of sets of ten-minute digit codes are acquired, and a process of removing an influence due to a noise from the plurality of sets of ten-minute digit codes (process of calculating the arithmetic average) is executed and the code values can be discriminated. Therefore, it is possible to perform accurate code discrimination of the ten-minute digit even under poor radio wave conditions.

In addition, with respect to the hour code, the code indicating the year, the month, and the date, and the code indicating the day of the week, during the period where the codes become have the same value, the plurality of sets of code portions are acquired, and a process of removing an influence due to a noise from the plurality of sets of codes (process of calculating an arithmetic average) is executed and a code value is determined. Therefore, even under poor radio wave conditions, it is possible to perform accurate code discrimination of the code portions.

Thus, the accurate time correction processing can be achieved by the accurate code discrimination even under poor radio wave conditions. Further, since the radio wave receiving IC 20 is operated in only a place that is needed to determine each code portion, the total power consumption that is needed to receive a radio wave can be decreased.

The present invention is not limited to the above-described embodiment, and various modifications can be made. For example, in the above embodiment, a plurality of sets of one-minute digit codes are acquired at a time interval of 10 minutes, but any time interval may be employed, such as 20 minutes, as long as the one-minute digit codes are equal to each other.

Further, in the above embodiment, the period during which the plurality of ten-minute digit codes are acquired is set to 10-minute period from x0 minute (x is an arbitrary value of a ten-minute digit), but any time period from, any start time may be employed as long as the ten-minute digit values are kept invariant during the time period, such as 8-minute period from x2 minute or 6-minute period from x4 minute.

Further, in the first embodiment, by calculating the arithmetic average of the plurality of sets of partial codes, the influence due to the noise is removed and the erroneous discrimination is reduced. However, during a statistic process for reducing the erroneous discrimination, various methods may be applied. For example, the arithmetic average of the plurality of sets of partial codes may be calculated and the influence due to the noise may be removed. Alternatively, an average may be calculated after excluding data having a large variation among the plurality of sets of codes, and the influence due to the noise may be removed.

Further, in the first embodiment, the accurate discrimination of the partial codes is enabled by executing an averaging process on line waveform data of the predetermined partial codes (the one-minute digit codes or the ten-minute digit codes). Alternatively, by executing an averaging process on a data value (whether the corresponding data is “1” data whose pulse width is 0.5 second and “0” data whose pulse width is 0.8 second) of each data pulse that constitutes the predetermined partial code, discrimination of the corresponding partial code may be performed on the basis of the data value of the data pulse that is subjected to the averaging process.

Second Embodiment

A wave clock of a second embodiment is the same as that of the first embodiment except for a discrimination method of an one-minute digit code in the minute code discrimination processing (Step S5 of FIG. 2). Accordingly, only the configuration that is different from that of the first embodiment will be explained below.

Figure 6:
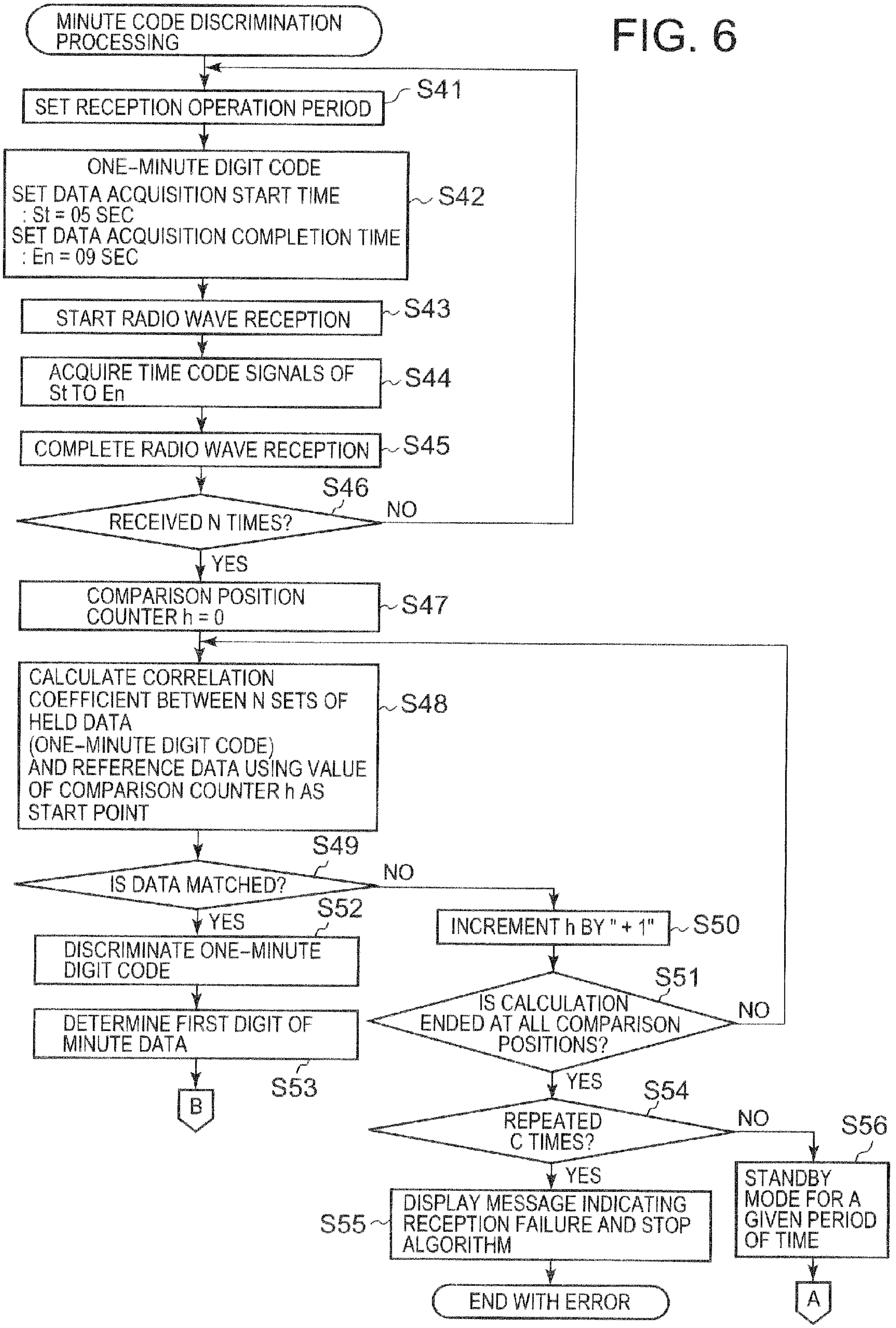
FIG. 6 is a first half of a flowchart illustrating a minute delta discrimination processing of a second embodiment.
Figure 7:
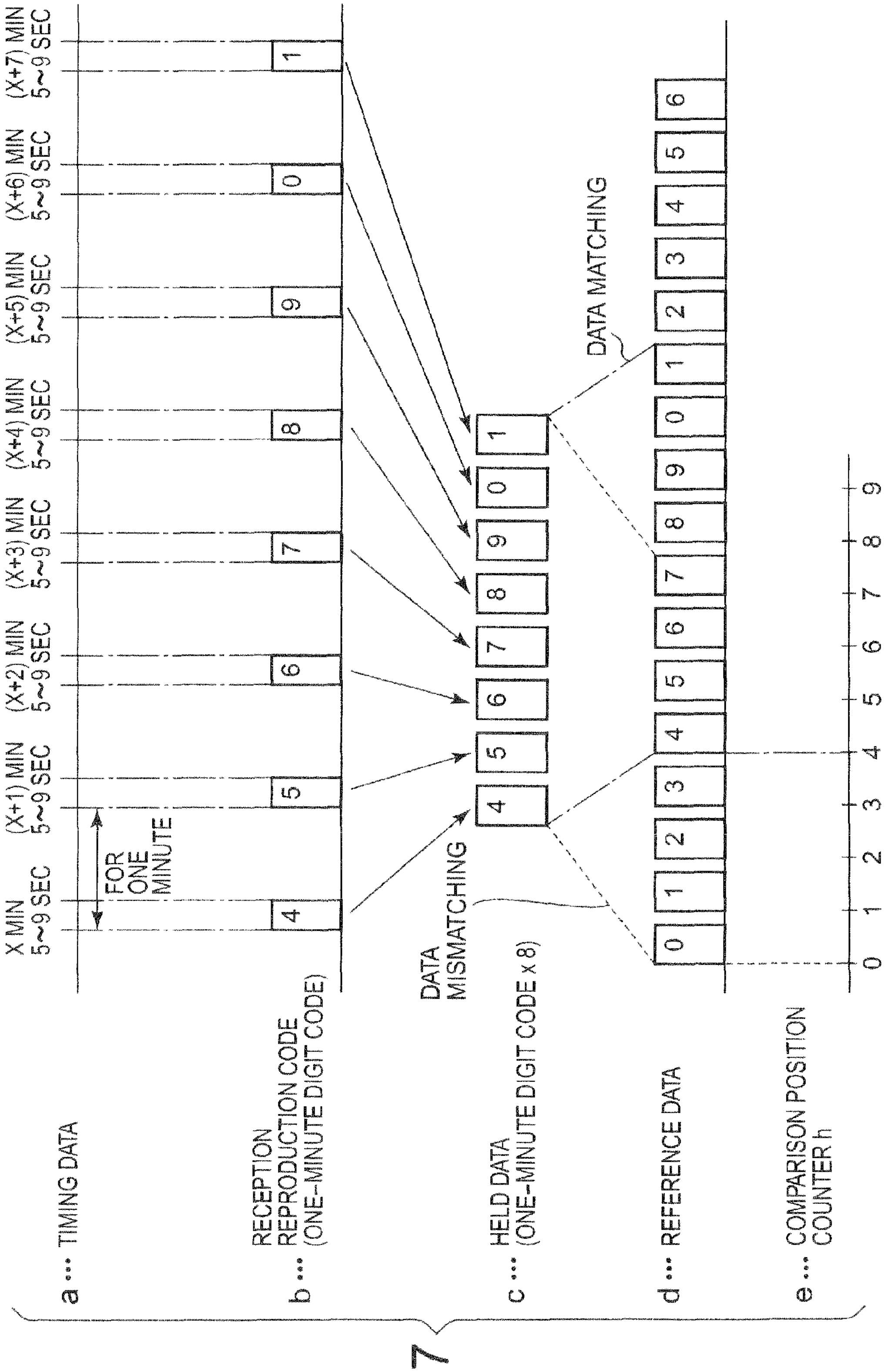
FIG. 7 is an illustration diagram of a comparison processing of one-minute digit codes according to the second embodiment.

FIG. 6 is a flowchart illustrating a first half of a minute data discrimination processing of the second embodiment. FIG. 7 is an illustration diagram of a comparison processing of one-minute digit codes according to the second embodiment. Specifically, FIG. 7-(*a*) shows timing data of the timer circuit 15, FIG. 7-(*b*) shows an one-minute digit code that is received, and reproduced, by the radio wave receiving IC 20, FIG. 7-(*c*) shows a plurality of sets of one-minute digit codes that are acquired and held by the control circuit 10, FIG. 7-(*d*) shows reference data indicating a transition pattern of an one-minute digit code, and FIG. 7-(*e*) shows a comparison position counter value indicating comparison positions of the held data and the reference data.

In the minute code discrimination processing of the second embodiment, a plurality of sets of one-minute digit codes that vary with a predetermined pattern are acquired, the plurality of sets of one-minute digit codes are compared with the transition pattern of an original one-minute digit code while shifting the comparison positions, and a position where the plurality of sets of one-minute digit codes match with a portion of the transition pattern is detected to discriminate the one-minute digit code.

Specifically, as shown in FIG. 6, in the minute code discrimination processing, first, the control circuit 10 sets a period where the radio wave receiving IC 20 is operated (Step S41), and sets acquisition start timing St and acquisition completion timing En of the time code signal reproduced to acquire the code of the one-minute digit (Step S42). Since the code of the one-minute digit is disposed in code portions of 05 to 08 seconds of the time code, the CPU of the control circuit 10 sets the acquisition start timing St as 0.5 second and the acquisition completion timing En as 0.9 second. The operation period of the radio wave receiving IC 20 is set such that reproduction of the time code signal is enabled at timings St to En.

Next, the control circuit 10 operates the radio wave receiving IC 20 in accordance with the setting of Steps S41 and S42 (Step S43), performs an AD conversion on the time code signals demodulated by the radio wave receiving IC 20 at the timings Sn to En, and acquires the converted time code signals as waveform data (Step S44). When the control circuit 10 acquires the waveform data, the control circuit 10 stops the operation of the radio wave receiving IC 20 (Step S45). By these processes, one-time waveform data of the code of the one-minute digit that is included in the time code of one frame is acquired.

If the one-time waveform data is acquired, the control circuit 10 confirms whether data acquisition corresponds to N times (8 times) is completed (Step S46). At this time, when the data acquisition corresponding to N times is not completed, the control circuit 10 returns to Step S41 in order to acquire a subsequently transmitted one-minute digit code. If the data acquisition corresponding to N times is completed, the control circuit proceeds to the following Step S47.

If the loop process of Steps S41 to S46 is repeated N times, as shown in FIG. 7-(*a*) and FIG. 7-(*b*), the one-minute digit codes that are transmitted in 05 to 09 seconds of X to (X+7) minutes are received and reproduced. As shown in FIG. 7-(*c*), the N sets of waveform data is acquired and held by the control circuit 10. In FIG. 7, the one-minute digit code is represented by one block, and a value of the one-minute digit data that is represented by the code is shown in the corresponding block.

In this case, since the plurality of groups of one-minute digit codes that are held by the control circuit 10 are received at a time interval of one minute, the individual data values are sequentially varied one by one (however, the data value is varied to “0” after “9”). Further, by the receiving process timing, the first acquired data value of the one-minute digit code is varied from “0” to “9”.

If the control circuit 10 acquires the N sets of one-minute digit data and proceeds to Step S47, first, the control circuit 10 sets a comparison position counter h as an initial value “0”. The comparison position counter h is a variable indicating a comparison position that is formed in a memory space for work of the control circuit 10.

Next, as shown in FIG. 7-(*c*) to FIG. 7-(*e*), the waveform data of the N sets of one-minute digit codes and the reference data indicating the transition pattern of the waveform data of the original 1 minute code are compared with each other at a comparison position using a value of the comparison position counter h as a start point, and a correlation coefficient indicating similarity is operated (Step S48). The reference data includes all variations such that the compared N sets of one-minute digit codes are included in any position.

If the correlation coefficient is calculated, the control circuit 10 determines whether the data is marched by comparing the corresponding value with a threshold value (Step S49). If the correlation coefficient is larger than the threshold value and it is determined that the data is matched, the algorithm proceeds to Step S52. However, if the data is not matched, the control circuit 10 increments the comparison position counter h (Step S50), and determines whether the calculation of the correlation coefficient is ended at all comparison positions (Step S51). If the calculation of the correlation coefficient is not ended at all comparison positions, the algorithm returns to Step S48.

By the loop process of Steps S48 to S51, the held data of FIG. 7-(*c*) is sequentially compared with the reference data of FIG. 7-(*d*) at the positions “0” to “9” of the comparison position counter h of FIG. 7-(*e*) as the starting points to calculate a correlation coefficient between the held data and the reference data. When the held data and the reference data are matched with each other at the comparison position where the compression position counter h becomes “4”, for example, the calculated correlation coefficient exceeds the threshold value, and it is determined that the data is matched.

If it is determined that the data is matched in Step S49, the control circuit 10 discriminates the one-minute digit code held on the basis of the value of the comparison position counter h at the corresponding point of time (Step S52), and the current value of the one-minute digit code is reflected in the value of the one-minute digit code of the internal counter on the basis of the discrimination (Step S53).

When the discrimination of the one-minute digit code is ended, the algorithm proceeds to the discrimination process of the ten-minute digit code. The discrimination process of the ten-minute digit code is the same as that in the first embodiment shown in FIG. 4.

If the calculation of the correlation coefficient is ended at all of the comparison positions without matching the data (YES in Step S51), the algorithm proceeds to Step S54 to check whether discrimination failure of the one-minute digit code is repeated C times (for example, three times). If the discrimination failure is repeated C times, the control circuit 10 causes the display unit 11 to display a message indicating reception failure and stops the algorithm of the time correction processing (Step S55), and terminates this control processing with error. If the discrimination failure is not repeated C times, a standby mode for a given period of time occurs in order to execute the receiving process again after 30 minutes or one hour, for example (Step S56), and the algorithm returns to Step S1 in the time correction processing of FIG. 2.

As described above, according to the code discrimination apparatus (the control circuit 10, the storage unit 12, and the timer circuit 15) and the wave clock 1 of the second embodiment, the control circuit 10 acquires the waveform data of the plurality of sets of one-minute digit codes that are varied in accordance with the predetermined pattern, calculates the correlation between the acquired waveform data and the reference data as a transition pattern of the original one-minute digit code while shifting the comparison positions, and discriminates the acquired one-minute digit code. With this, as compared with when the code discrimination is performed based on only one set of one-minute digit codes, the influence of the noise can be reduced and the accurate discrimination of the one-minute digit code can be achieved.

Further, in the method of determining a code according to the first embodiment, long time (for example, 10 minute interval×8 sets=80 minutes) is needed to determine the one-minute digit code. However, in the method of determining a code according to the second embodiment, the one-minute digit code can be determined in short time (for example, 1 minute interval×8 sets=8 minutes).

Further, the present invention is not limited to the above embodiment, and various modifications can be made. For example, in the second embodiment, in order to calculate the correlation between the acquired N sets of one-minute digit codes and the reference data, a correlation coefficient of the waveform data is calculated, but the present invention is not limited thereto. For example, a correlation coefficient of data values ("0" or "1") of the individual data pulses that constitute the one-minute digit code may be calculated or a correlation coefficient of data values of the one-minute digits that are represented by the one-minute digit codes may be calculated. That is, various variations can be applied.

Further, in the second embodiment, the plurality of sets of one-minute digit codes are acquired at a time interval of one minute, out any time interval may be employed, such as 2 minutes or 3 minutes. If a time interval of 2 minutes or 3 minutes is employed, a pattern in which the original one-minute digit code is varied at a time interval of 2 minutes or 3 minutes may be used as the reference data that is compared with the acquired one-minute digit codes.

FIGS. 11A to 11E show explanatory diagrams of data pulses, each of which constitutes a time code of each country. Even if a format of a time code or a data pulse thereof differs from country to country as shown in FIGS. 11A to 11E, the above-embodiments of the present invention can be applied depending on the format of each country.

FIGS. 11A to 11E show types of data pulse in Japan, United States of America, Germany, Switzerland, and United Kingdom, respectively.

With respect to the detailed configurations and methods in the above-described embodiments, such as methods of detecting a second synchronization point and a minute synchronization point, it will be apparent to those skilled in the art that various modification and variations can be made without departing from the scope of the invention.

What is claimed is:

1. A time code discrimination apparatus that discriminates a time code including one-minute digit and ten-minute digit codes, the time code discrimination apparatus comprising:

a waveform data acquiring section to acquire waveform data of the one-minute digit code arranged at a predetermined position in a format of the time code of a standard radio wave;

a first code acquiring section to acquire the waveform data of a plurality of sets of one-minute digit codes, which are acquired by the waveform data acquiring section, a predetermined number of times at a time interval of one minute;

a comparison section to compare (i) the waveform data of the plurality of sets of one-minute digit codes acquired by the first code acquiring section with (ii) reference data indicating waveform data of an original one-minute digit code while shifting comparison positions;

a comparison position indication section that indicates a comparison position of (i) the waveform data of the plurality of sets of one-minute digit codes and (ii) the reference data; and a first code discrimination section to detect which position in the reference data the waveform data of the plurality of sets of one-minute digit codes correspond to, and to discriminate the waveform data of the plurality of sets of one-minute digit codes based on the comparison position indicated by the comparison position indication section, when it is determined by a result from the comparison section that the waveform data of the plurality of sets of one-minute digit codes matches the reference data.

2. The time code discrimination apparatus according to claim 1, wherein the first code discrimination section is configured to compare a numerical sequence of one-minute digit values indicated by the waveform data of the plurality of sets of one-minute digit codes acquired by the first code acquiring section with one-minute digit values indicated by the reference data indicating the waveform data of the original one-minute digit code.

3. The time code discrimination apparatus according to claim 1, further comprising:

a period calculating section to calculate a period during which ten-minute digit values are kept invariant, based on one-minute digit values for the waveform data of the one-minute digit codes discriminated by the first code discrimination section;

a second code acquiring section to acquire waveform data of a plurality of sets of ten-minute digit codes during the period calculated by the period calculating section; and a second code discrimination section to execute a process of reducing erroneous discrimination on the waveform data of the plurality of sets of ten-minute digit codes acquired by the second code acquiring section and to discriminate the waveform data of the ten-minute digit codes.

4. The time code discrimination apparatus according to claim 3, wherein the second code discrimination section is configured to perform an averaging process on the waveform data of the plurality of sets of ten-minute digit codes acquired by the second code acquiring section and to discriminate the waveform data of the ten-minute digit codes on which the averaging process has been performed.

5. A wave clock, comprising:

a radio wave receiving unit to receive a standard radio wave and demodulate a time code; and the time code discrimination apparatus of claim 1 to discriminate the time code.

* * * * *